United States Patent
Hadar (10) Patent No.: US 10,723,512 B2
(45) Date of Patent: Jul. 28, 2020

(54) COUPLING SYSTEM AND AN ARTICLE EMPLOYING SAME

(71) Applicant: Plasel Plastic Ltd., Lavon Industrial Park (IL)

(72) Inventor: Nir Hadar, Kibbutz Shefayim (IL)

(73) Assignee: PLASEL PLASTIC LTD., Lavon Industrial Park (IL)

( * ) Notice: Subject to any disclaimer, the term of this patent is extended or adjusted under 35 U.S.C. 154(b) by 0 days.

(21) Appl. No.: 16/327,223

(22) PCT Filed: Aug. 29, 2017

(86) PCT No.: PCT/IL2017/050963
§ 371 (c)(1),
(2) Date: Feb. 21, 2019

(87) PCT Pub. No.: WO2018/042429
PCT Pub. Date: Mar. 8, 2018

(65) Prior Publication Data
US 2019/0233165 A1    Aug. 1, 2019

(30) Foreign Application Priority Data
Aug. 29, 2016 (IL) .......................... 247539

(51) Int. Cl.
*B65D 21/08* (2006.01)
*B25H 3/00* (2006.01)

(52) U.S. Cl.
CPC .......... *B65D 21/086* (2013.01); *B65D 21/08* (2013.01); *B25H 3/003* (2013.01)

(58) Field of Classification Search
CPC ...... B65D 21/00; B65D 21/08; B65D 21/086; B65D 85/20
(Continued)

(56) References Cited

U.S. PATENT DOCUMENTS 1,189,052 A  *  6/1916  Brookshire ........... F16L 37/144
                                                           285/303
1,370,207 A  *  3/1921  Haase .................... E03B 9/10
                                                           220/8
1,450,674 A  *  4/1923  Marston ............... A45C 7/0031
                                                           220/8

(Continued)

FOREIGN PATENT DOCUMENTS

EP           2848548 B1    5/2016
WO           18002920 A1   1/2018

*Primary Examiner* — Chun Hoi Cheung
*Assistant Examiner* — Brijesh V. Patel
(74) *Attorney, Agent, or Firm* — Dorsey & Whitney LLP (57) ABSTRACT

A container comprises a cover member and a receptacle member axially displaceable therewithin for selective axial arresting therewith. A polygonal locking neck of the cover member telescopingly receives a polygonal portion of the receptacle member. A circumcircle of the polygonal portion is smaller than an inscribed circle of the polygonal locking neck. The polygonal portion of the receptacle member can be reciprocated about a longitudinal axis between a locked position at which an arresting member is engaged with locking teeth of the receptacle member, and an unlocked position at which the at least one arresting member is disengaged from the locking teeth of the receptacle member. Twisting of the cover member and the receptacle member at opposite senses results in disengaging the locking teeth of the receptacle member from the at least one arresting member of the cover member, into the unlocked position.

13 Claims, 9 Drawing Sheets

(58) Field of Classification Search
USPC ........ 220/8, 4.26, 4.27, 23.83, 23.86, 23.87, 220/23.89, 23.91, 4.03, DIG. 13; 206/1.5, 206/349; 24/455
See application file for complete search history.

(56) References Cited

U.S. PATENT DOCUMENTS

| | | | | |
|---|---|---|---|---|
| 3,425,719 | A * | 2/1969 | Burton | F16L 13/161 285/382.2 |
| 4,046,279 | A * | 9/1977 | Rosler | B65D 21/086 220/8 |
| 4,210,253 | A * | 7/1980 | Rosler | B65D 21/086 220/8 |
| 4,509,656 | A * | 4/1985 | Rosler | B65D 21/086 220/8 |
| 4,596,340 | A * | 6/1986 | Luther | B65D 21/086 220/8 |
| 5,562,212 | A * | 10/1996 | Rosler | B25H 3/003 206/379 |
| 5,605,242 | A * | 2/1997 | Hwang | B65D 21/086 220/4.03 |
| 5,680,949 | A | 10/1997 | Roesler | |
| 5,829,591 | A * | 11/1998 | Lyons | B65D 21/086 206/373 |
| 7,740,136 | B2 * | 6/2010 | Roesler | B25H 3/003 206/379 |
| 8,789,694 | B2 * | 7/2014 | Roesler | B65D 21/086 206/1.5 |
| 9,016,514 | B2 * | 4/2015 | Feldman | A47G 23/0216 220/739 |
| D741,709 | S | 10/2015 | Sohler | |
| D747,185 | S | 1/2016 | Roesler | |
| 2003/0155274 | A1* | 8/2003 | Rosler | B65D 25/101 206/591 |
| 2009/0308867 | A1* | 12/2009 | Lal | B65D 21/086 220/8 |
| 2013/0068645 | A1* | 3/2013 | Roesler | B65D 25/103 206/349 |
| 2013/0334220 | A1 | 12/2013 | Sohler | |
| 2015/0076140 | A1* | 3/2015 | Roesler | B65D 11/00 220/4.01 |
| 2015/0076149 | A1 | 3/2015 | Roesler | |
| 2016/0251121 | A1* | 9/2016 | Hadar | B65D 21/08 215/44 |

* cited by examiner

COUPLING SYSTEM AND AN ARTICLE EMPLOYING SAME

TECHNOLOGICAL FIELD

The present disclosure is directed to a method and system used for coupling of two elements to one another about a common axis thereof. The disclosure is further directed to an article utilizing such a coupling method.

BACKGROUND

Plastic containers are commonly provided for containing therein objects. In some applications, for example for containing precision tools, there are often advantages to providing a container which is of sufficiently size to contain the objects, without being bigger than necessary. Accordingly, such containers must be manufactured to contain a specific object, or provided such that the size is adjustable to be suitable for a wide range of objects. An article which is provided so as to be size-adjustable may also be configured for coupling two cords, for example to facilitate selection of a suitable length therefor.

GENERAL DESCRIPTION

A system and an article according to the disclosure is suitable for coupling of a first (cover) member and a second (receptacle) member to one another, about a coaxial longitudinal axis, wherein the axial distance between distal ends of said first member and second member is adjustable.

According to a first aspect of the present disclosure there is disclosed a system for axial coupling a first member with a second member, said first member comprises at least a polygonal locking neck telescopingly receiving a polygonal portion of the second member; said locking neck is configured over at least one inside wall thereof with at least one arresting member; at least one outside face of the polygonal portion of the second member comprises an arresting portion having a plurality of locking teeth disposed along said arresting portion;

wherein the circumcircle of the polygonal portion of the second member is smaller than the inscribed circle of the polygonal locking neck of the first member, such that the polygonal portion of the second member can be reciprocated about a longitudinal axis between a locked position at which the at least one arresting member is engaged with the locking teeth of the second member, thereby preventing axial displacement of the first member with respect to the second member, and an unlocked position at the at least one arresting member is disengaged from the locking teeth of the second member, thereby facilitating axial displacement of the first member with respect to the second member;

and wherein one or both of the first member and the second member comprises a biasing arrangement for biasing the second member into the locked position and wherein one or both of at least the locking neck of the first member and the polygonal portion of the second member are elastically deformable, whereby twisting the first member and the second member at an opposite sense, against said biasing arrangement, results in disengaging the locking teeth of the second member from the at least one arresting member of the first member, into the unlocked position. The term telescopingly as used herein suggests that at least the polygonal portion of the second member is axially displaceable within at least the polygonal locking neck portion of the first member.

The term elastically deformable denotes that the respective element is deformable upon applying thereto twisting force along its longitudinal axis, and wherein said respective element re-assumes its original, non-deformed position, as before applying said twisting force.

The arrangement is such that the second member is normally biased into the locked position, wherein unlocking requires applying a twisting motion to the first member and the second member by elastic deformation of one or both, thereby facilitating axial displacement only as long as the members are twisted against said biasing arrangement, wherein upon stopping the external twisting force applied to the members, the locking position is spontaneously reassumed. According to a second aspect of the disclosure there is disclosed an article comprising a first member and a second member at least partially slidingly received within said first member and axially displaceable therewithin; said first member comprising at least a polygonal locking neck telescopingly receiving a polygonal portion of the second member; said locking neck is configured over at least one inside wall thereof with at least one arresting member; at least one outside face of the polygonal portion of the second member comprises an arresting portion having a plurality of locking teeth disposed along said arresting portion;

wherein the circumcircle of the polygonal portion of the second member is smaller than the inscribed circle of the polygonal locking neck of the first member, such that the polygonal portion of the second member can be reciprocated about a longitudinal axis between a locked position at which the at least one arresting member is engaged with the locking teeth of the second member, thereby preventing axial displacement of the first member with respect to the second member, and an unlocked position at the at least one arresting member is disengaged from the locking teeth of the second member, thereby facilitating axial displacement of the first member with respect to the second member;

and wherein one or both of the first member and the second member comprises a biasing arrangement for biasing the second member into the locked position and wherein one or both of at least the locking neck of the first member and the polygonal portion of the second member are elastically deformable, whereby twisting the first member and the second member at an opposite sense, against said biasing arrangement, results in disengaging the locking teeth of the second member from the at least one arresting member of the first member, into the unlocked position. In use, the polygonal portion of the second member is introduced into the first member through the polygonal locking neck, until a desired position, and then the article is spontaneously biased into the locked position as discussed herein above.

The term desired position can be at any axial position with limits when an end of the polygonal portion reaches a base end of the first member, or until an end of the locking neck reaches a manipulating portion of the second member, or until an article received within the second member engages the base end of the first member.

According to one particular example the article is a container wherein the first article is a so-called cover member and the second member is a receptacle/carrier member. This configuration is useful wherein it is required to alter the effective storing length between a base portion of the cover member and a base member of the receptacle member.

According to yet an aspect of the disclosure there is a container comprising a cover member and a receptacle member at least partially slidingly received within said cover member and axially displaceable there within and configured for selective axial arresting within said cover member, said cover member comprising at least a polygonal locking neck telescopingly receiving a polygonal portion of the receptacle member; said locking neck is configured over at least one inside wall thereof with at least one arresting member; at least one outside face of the polygonal portion of the receptacle member comprises an arresting portion having a plurality of locking teeth disposed along said arresting portion;

wherein the circumcircle of the polygonal portion of the receptacle member is smaller than the inscribed circle of the polygonal locking neck of the cover member, such that the polygonal portion of the receptacle member can be reciprocated about a longitudinal axis between a locked position at which the at least one arresting member is engaged with the locking teeth of the receptacle member, thereby preventing axial displacement of the cover member with respect to the receptacle member, and an unlocked position at the at least one arresting member is disengaged from the locking teeth of the receptacle member, thereby facilitating axial displacement of the cover member with respect to the receptacle member;

and wherein one or both of the cover member and the receptacle member comprises a biasing arrangement for biasing the receptacle member into the locked position and wherein one or both of at least the locking neck of the cover member and the polygonal portion of the receptacle member is elastically deformable, whereby twisting the cover member and the receptacle member at an opposite sense, against said biasing arrangement, results in disengaging the locking teeth of the receptacle member from the at least one arresting member of the cover member, into the unlocked position.

According to particular example the first member has a rectangular cross section (square in a most specific configuration) and the second member has a generally square cross section however wherein the arresting portion of each side wall thereof is disposed at an obtuse angle with respect to the respective side wall, and wherein the arresting portion of each to neighboring side walls are disposed at a right angle with respect to one another.

The arrangement is such that the biasing arrangement generates a twisting moment causing deformation of at least portions of the side walls, resulting in disengaging the locking teeth from the arresting member, into the unlocked position.

Any one or more of the following features, designs and configurations, can be implemented in any one of the aspects and configurations of the method, system and article according to the present disclosure, individually or in various combinations thereof:

- The profile of one or both of the at least one arresting member of the first member and the plurality of locking teeth of the second member facilitates axial displacement of the first member and the second member towards one another, also at the locked position thereof, i.e., without the need to twist and deform either or both the first member and the second member;
- The first member and the second member can be made of plastic material;
- The biasing arrangement can be a biasing projection extending at either an outside wall surface of the second member or an inside wall surface of the first member, said biasing projection configured for slidingly bearing against a respective other wall surface of the an outside wall surface of the second member or an inside wall surface of the first member. According to a particular example, the biasing arrangement is a bulge projecting from inside face of side walls at the polygonal locking neck of the first member;
- The size of the biasing member can be configured such that at the locked position it does not bear against the respective opposite wall surface, but rather upon attempting to twist the article into the unlocked position entails engagement of the biasing member against the respective opposite wall surface;
- The article can be a container. the container can be used for storage of cutting tools and the like;
- The article can be a coupler for coupling two elements to elements to one another, wherein axial adjustment may be required. An example can be coupling of a cord elements to one another;
- Each of the first member and the second member can be configured at a respective opposite end thereof with locking features similar to those of the first member or the second member, such that the article can be axially extended;
- Both the first member and the second member may comprise a corresponding polygonal shape. Said polygonal shape can extend the entire length of the respective first member and second member, or it can extend only at a respective operating locking portion of each of the first member and the second member;
- The at least one arresting member of the first member can be one or more arresting teeth;
- The one or more arresting teeth and the locking teeth intersect a longitudinal axis of the first member and the second member at a substantially right angle;
- The locking teeth of the second member and the arresting teeth of the first member can be equally distributed along an axial path;
- Angular displacement of the second member within the first member, at the locked position, is restricted upon engagement of the corners of the second member with the respective inside wall surface of the first member;
- The second member can be configured at a bottom end thereof, with a manipulating portion. According to one particular configuration said manipulating portion has an external shape substantially similar to that of an external shape the first member, such that at the fully retracted, locked/closed position said manipulating portion coextends with the first member;
- The at least one arresting member of the first member, and the plurality of locking teeth of the second member, can be equally spaced along an axial path and can further be of uniform thickness (axially measured), so as to substantially reduce or eliminate axial freedom between the first member and the second member, at the locked position;
- One or both of the first member (cover member) and the second member (receptacle member) of a container may comprise a tool receiving/supporting portion;
- One or both of the first member and the second member may comprise with indicia (e.g., visible and/or feel markings) for indicating the twisting direction or the locked/unlocked position.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Attention is first directed to FIGS. 1 to 7 of the drawings, directed to a particular example of an article according to the present disclosure, namely container 20. It is appreciated that whilst the example is directed to a specific article, the same principles of the disclosure, as will be set forth hereinafter, can apply to other types of articles and articles of different shapes, whether or not used as containers.

In the illustrated example, the container 20 has an elongate rectangular shape and can be used, by way of example only, for storage of elongate articles, such as machining tools (drills, mills), needles and the like. However, it is appreciated that the system subject of the present disclosure and an article accordingly, can assume different shapes.

The container 20 comprises a cover member 22, and a receptacle member 24, both having a polygonal cross section (square in the present example), made for example of polemic material and having thin side walls, rendering the container light weight and yet rigid, though as will be discussed herein, elastically deformable, at least to an extent. The receptacle member 24 is coaxially (telescopingly) received within the cover member 22, displaceable along a coaxial longitudinal axis X.

Figure 3A:
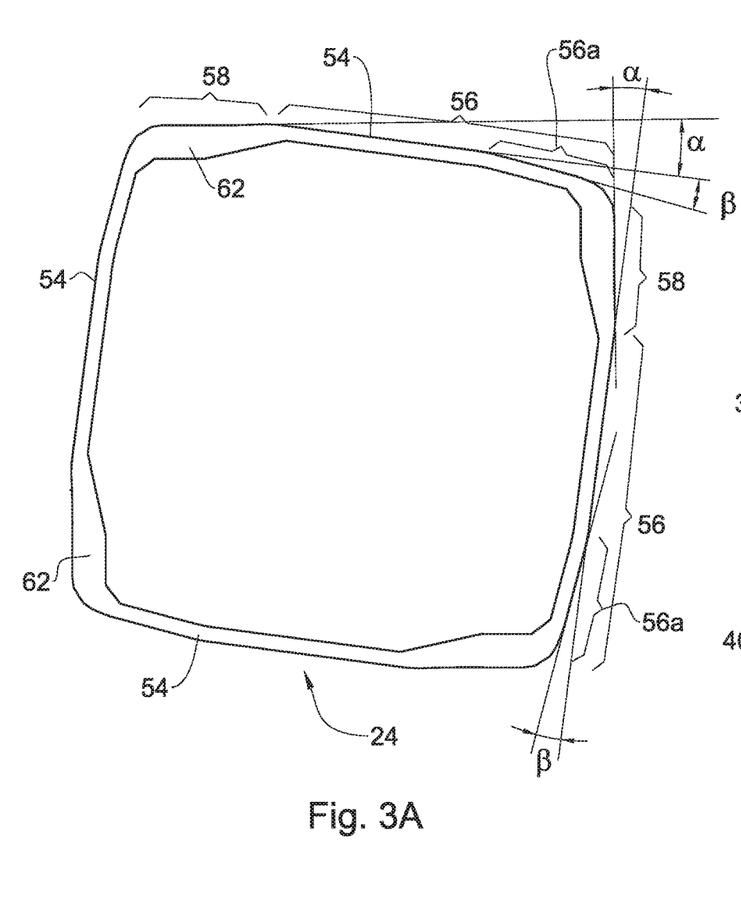
FIG. 3A is a planar section at plane 3A in FIG. 2A.
Figure 3B:
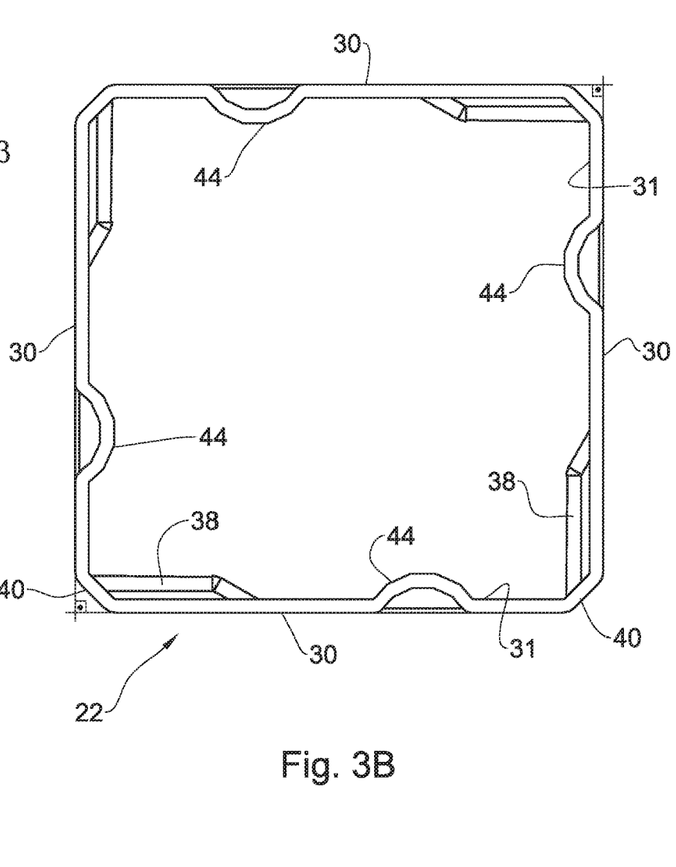
FIG. 3B is a planar section at plane 3B in FIG. 2B.

The cover member 22 has four parallely extending side walls 30 disposed at substantially right angles, as best seen and illustrated in FIG. 3B. Cover member 22 has a top base 32, and a locking neck portion 36 near an open, bottom end of the cover member 22. Locking neck portion 36 is configured at its four side walls with an arresting member by way of three parallely disposed, inwardly projecting (i.e., projecting from an inside surface 31 of the respective side wall) arresting teeth 38 extending at a substantially right angle to the longitudinal axis X, said arresting teeth 38 disposed adjacent following corners 40 of each of the side walls 30.

The cover member 22 is further configured at each side wall thereof, with a biasing member in the form of a bulge 44 inwardly projecting from inside surface 31 of the respective side walls 30. The purpose of the biasing bulge 44 will become apparent hereinafter.

Figure 2A:
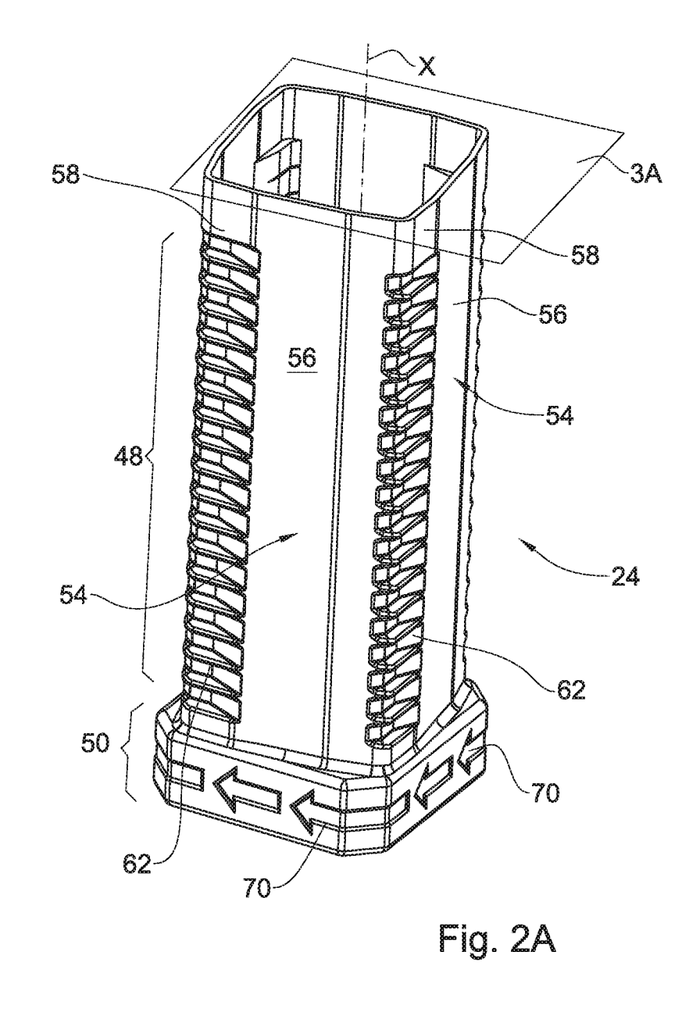
FIG. 2A is a top perspective view of a cover member, namely a receptacle member, of the container of FIG. 1.
Figure 2B:
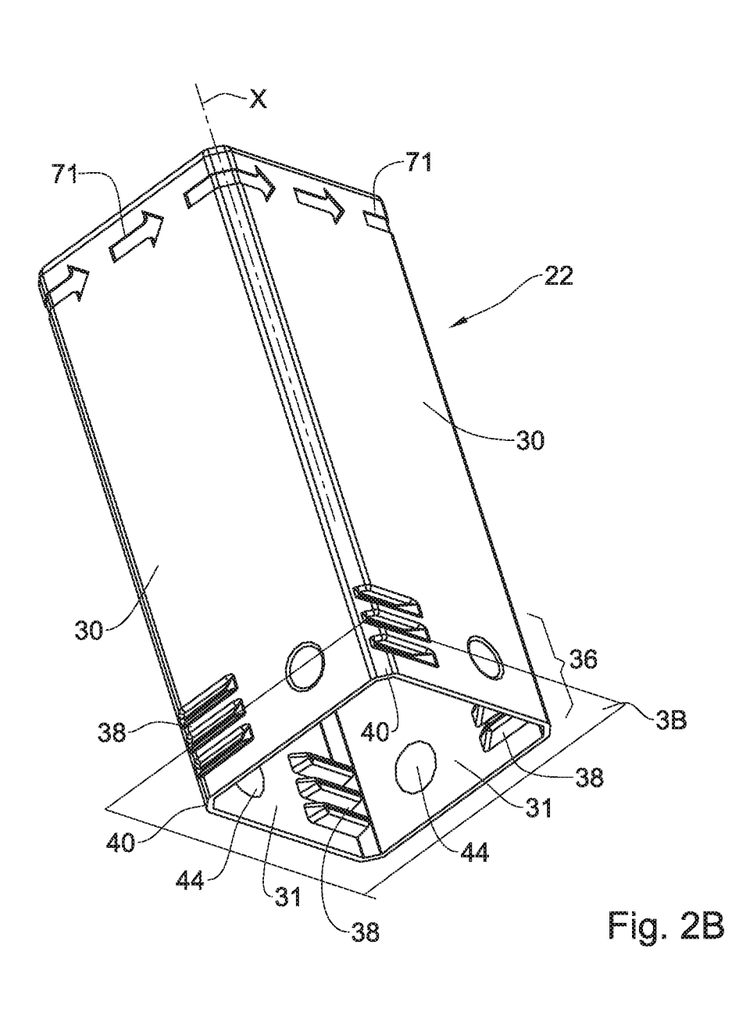
FIG. 2B is a bottom perspective view of a receptacle member, namely a cover member, of the container of FIG. 1.

In the present example the arresting teeth 38 extend from each respective corner, and at a following order along the respective side walls. It is however appreciated that the number of arresting teeth and their distribution over the side walls of the cover member 22 may differ (e.g., not extend over each side wall, have more or less teeth, etc) Likewise, the projecting bulges 44 can be configured differently (e.g., as a continuous projection, or not extend over each side wall). The receptacle member 24, has a generally rectangular shape and comprises a polygonal portion 48 shaped and sized for sliding insertion into the cover member 22, and a manipulating portion 50 (FIG. 2A). Four side walls 54 of the polygonal portion each comprise a flat face portion 56, and an arresting portion 58 extending at a reflex angle (best seen in FIG. 3A; for sake of clarity the complementary angle α is illustrated) with respect to said flat face portion 56. The arresting portion 58 comprises a plurality of locking teeth 62 disposed along said arresting portion 58, each configured for engaging with the arresting teeth 38 of the cover member 22. Further noted, the flat face portion 56 has an inclined surface portion 56a extending at reflex angle (for sake of clarity the complementary angle β is illustrated).

It is noted that the locking teeth 62 of the receptacle member 24 are shaped, sized and spaced apart in conformity with the arresting teeth 38 of the cover member 22, and are thus configured for arresting and setting an axial position of the receptacle member 24 within the cover member 22, as will be discussed hereinafter.

Figure 1A:
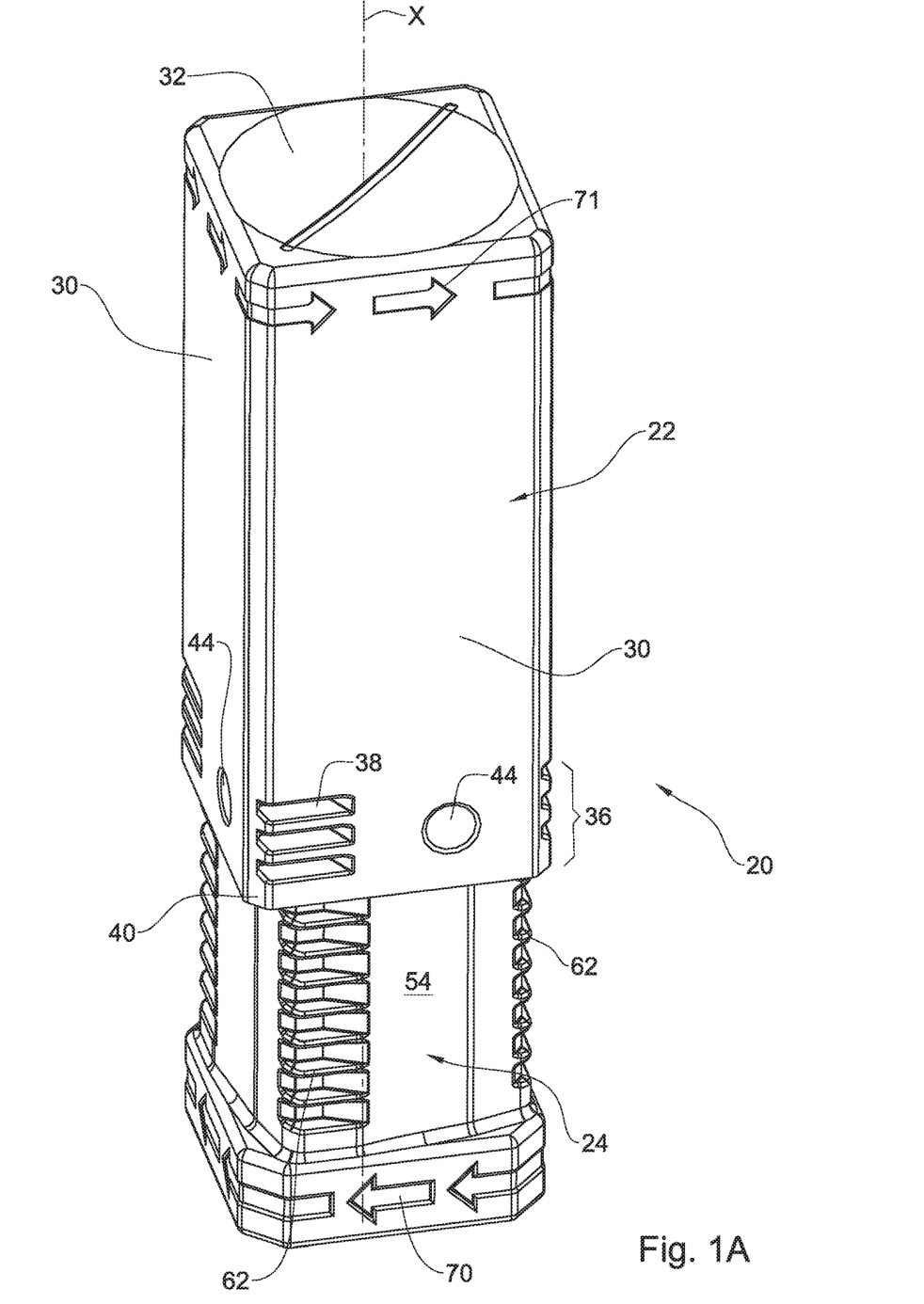
FIG. 1A is a top perspective view of a container according to an aspect of the present disclosure, at a closed/locked position, however partially retracted.
Figure 1B:
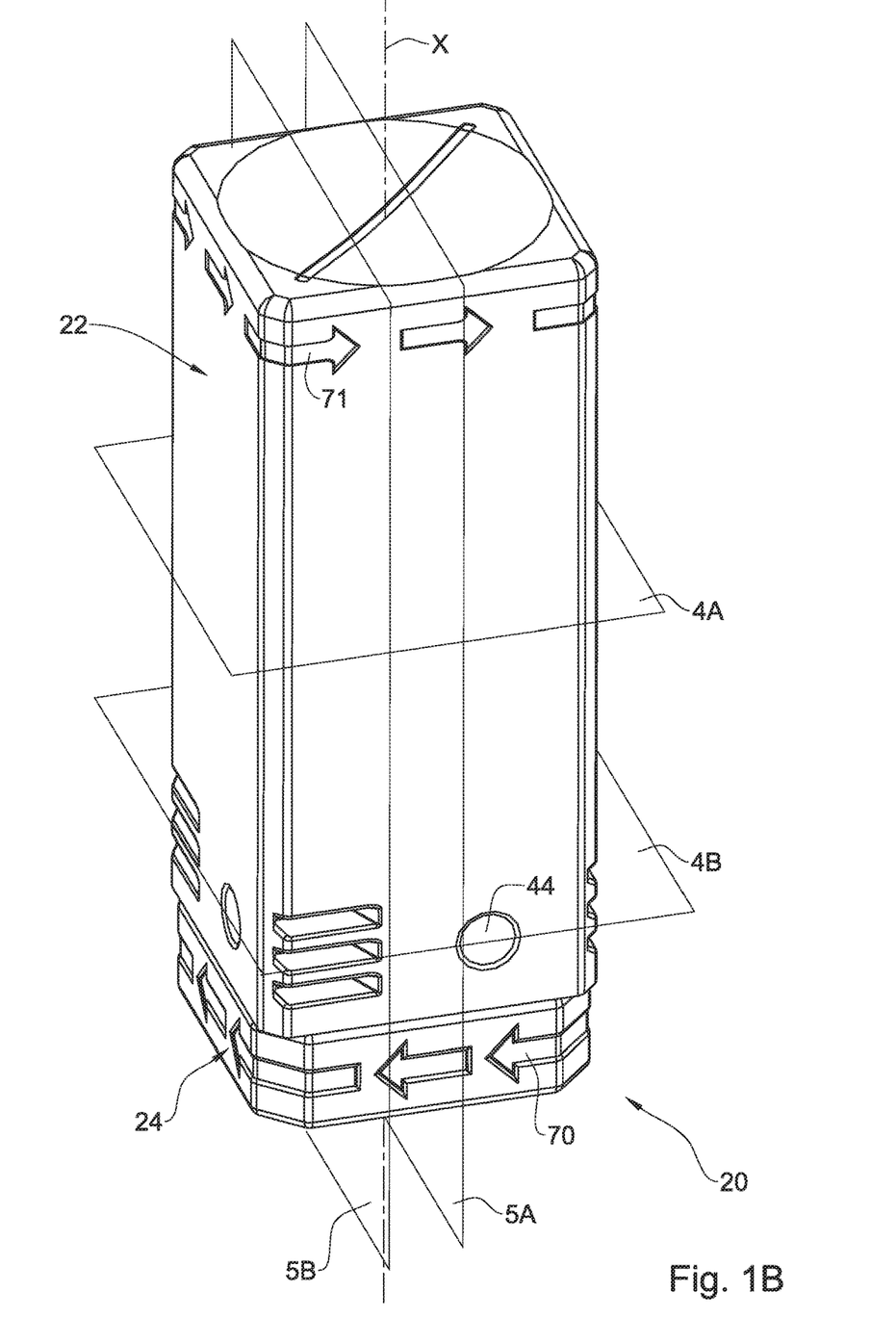
FIG. 1B illustrates the container of FIG. 1A at a closed, fully retracted position.
Figure 4A:
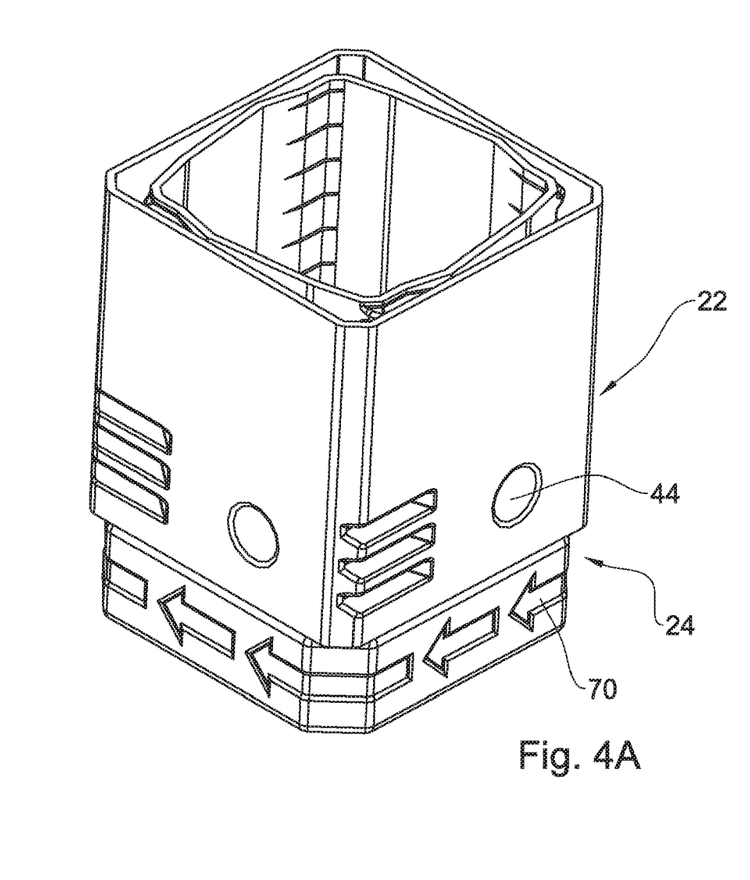
FIG. 4A is a top perspective sectioned view at plane 4A in FIG. 1B.
Figure 4B:
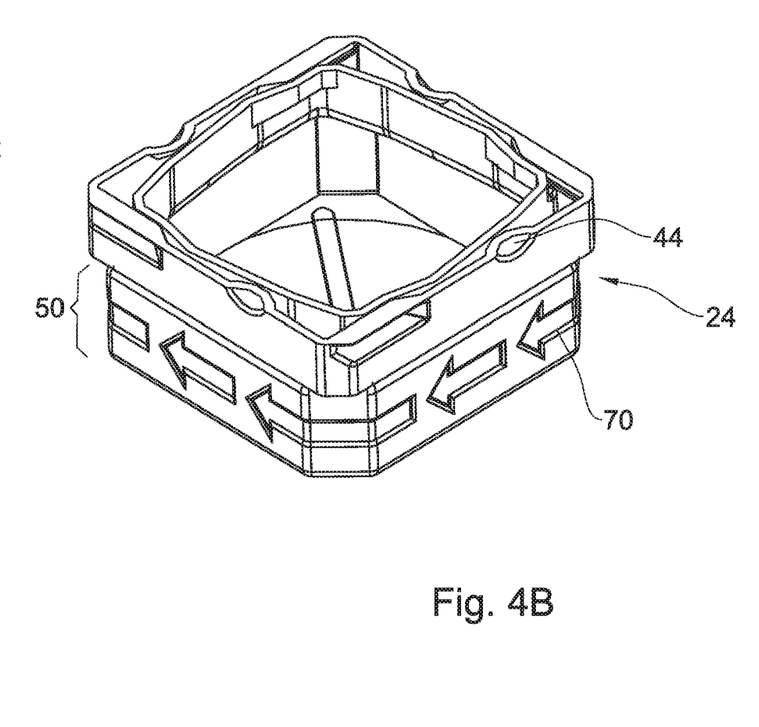
FIG. 4B is a top perspective sectioned view at plane 4B in FIG. 1B.
Figure 4C:
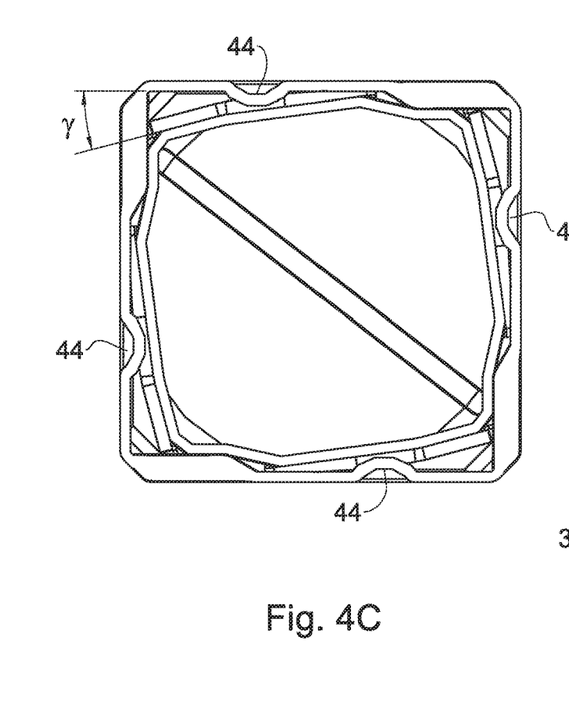
FIG. 4C is a top planar sectioned view of FIG. 4B.
Figure 5A:
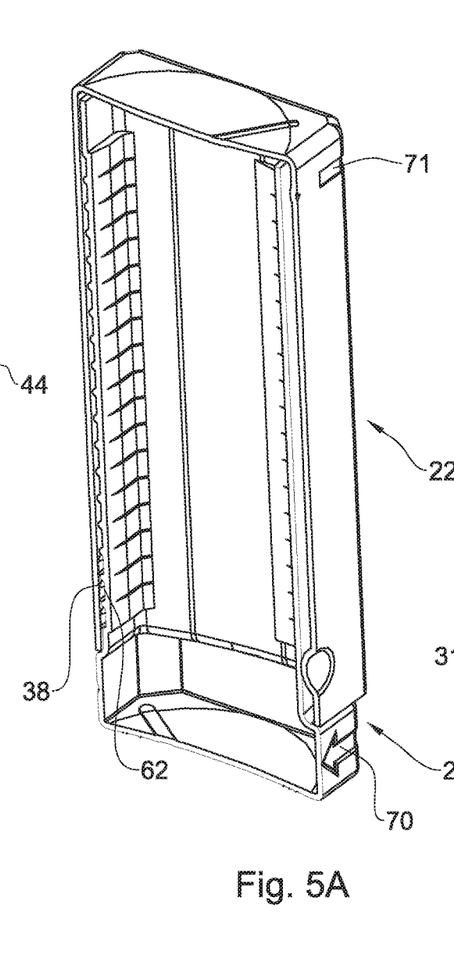
FIGS. 5A and 5B are a perspective sectioned view at plane 5A and 5B, respectively, in FIG. 1B.
Figure 5B:
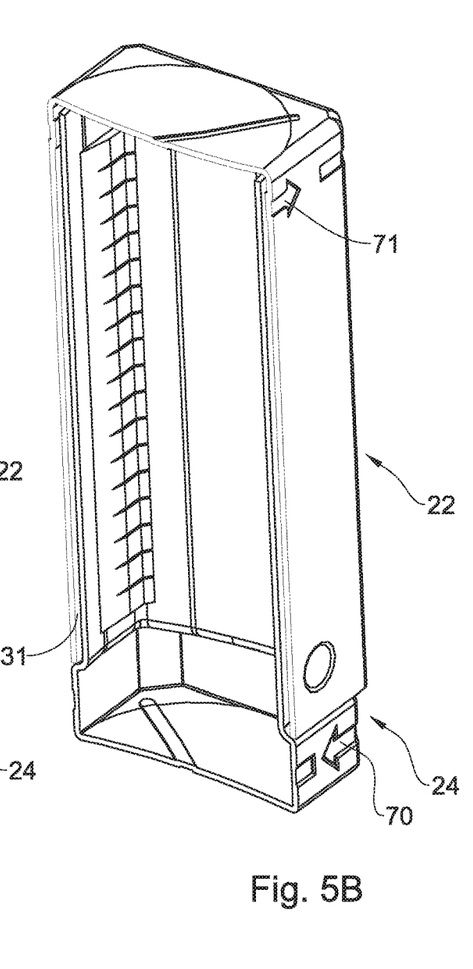

It is further noted that the polygonal portion 48 of the receptacle member 24 is slidingly displaceable within the polygonal locking neck portion 36 of the cover member 22 when at the unlocked/open position (FIGS. 6 and 7), i.e., only when the flat face portion 56 of the receptacle member 24 is disposed at an angle γ (best seen in FIG. 7) with respect to the inside surface 31 of the polygonal locking neck portion 36 (and along the cover member 22), at which position the locking teeth 62 of the receptacle member 24 are disengaged from the arresting teeth 38 of the cover member 22. Likewise, the receptacle member 24 is axially arrested within the cover member (referred to as the locked/closed position; FIGS. 1, 4 and 5) when the arresting teeth 38 of the cover member 22 are engaged with several of the locking teeth 62 of the receptacle member 24. At this position the arresting portion 58 of the receptacle member 24 is disposed substantially parallel with said inside wall surface 31 of the cover member 22. The cover member and the receptacle member will not spontaneously displace into the unlocked position owing to the presence of the obstructing biasing bulges 44.

Further noted, the manipulating portion 50 of the receptacle member 24 comprises a rectangular gripping shape and provided with indicia arrows 70, with indicia arrows 71 marked at the cover member 22, however at an opposite direction, together indicating the direction of twisting the assembly into the unlocked/open position, as will be discussed hereinafter. Also, the manipulating portion 50 of the receptacle member 24 has an external shape substantially similar to that of an external shape the cover member 22, such that at the fully retracted, locked/closed position said manipulating portion coextends with the cover member (FIGS. 1B, 4A, 4B, 5A, and 5B).

Figure 6:
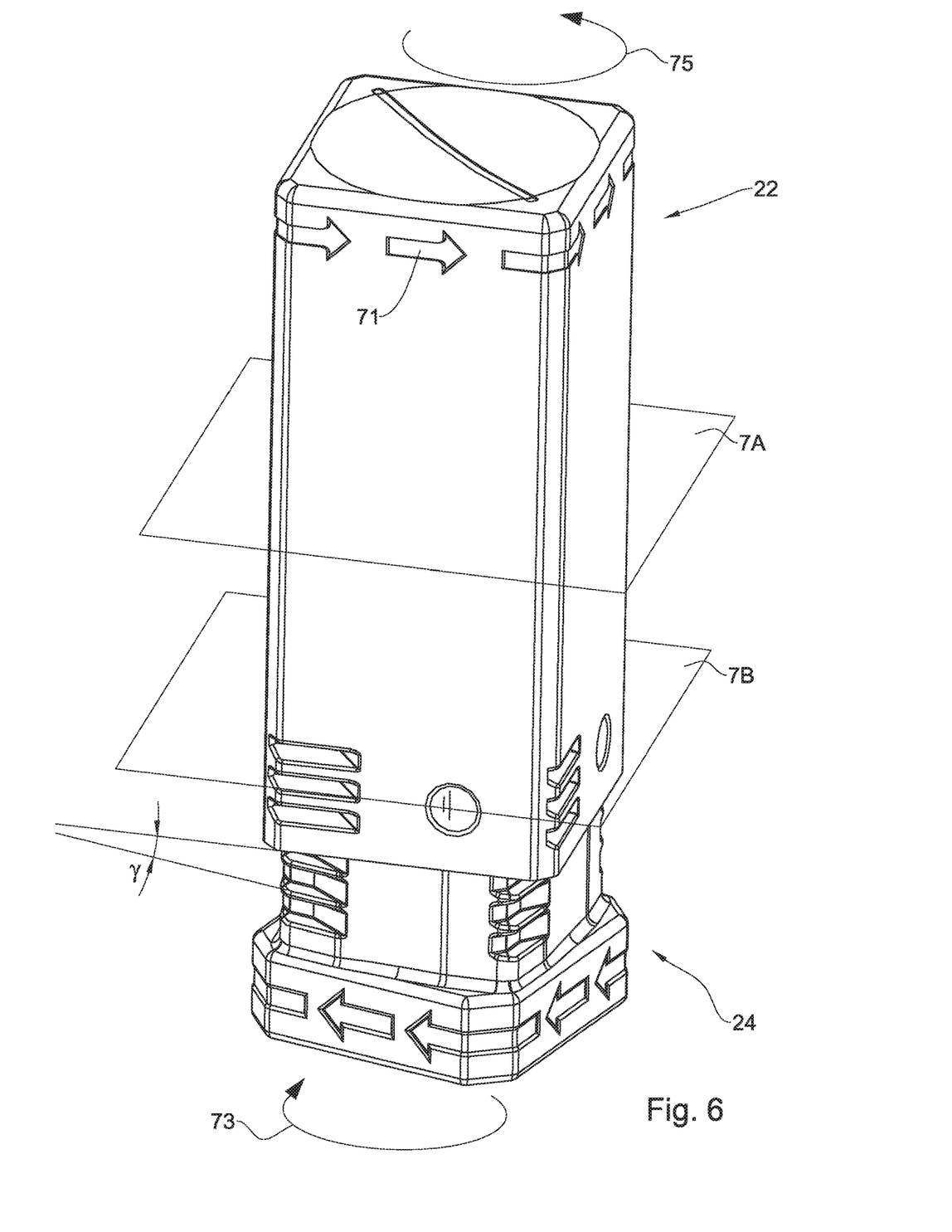
FIG. 6 is a top perspective view of the container, partially retracted, at a twisted, unlocked position.
Figure 7A:
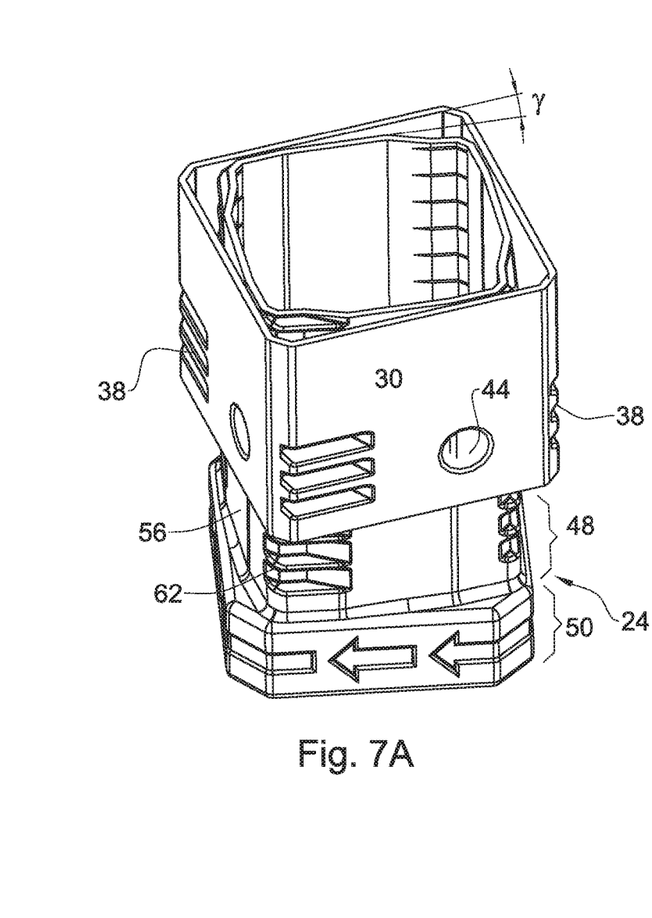
FIGS. 7A and 7B are a top perspective sectioned view at plane 7A and 7B, respectively, in FIG. 6.
Figure 7B:
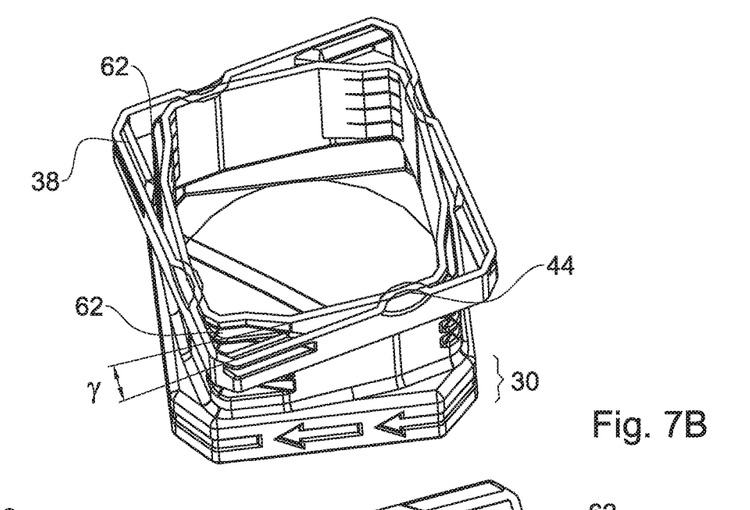
Figure 7C:
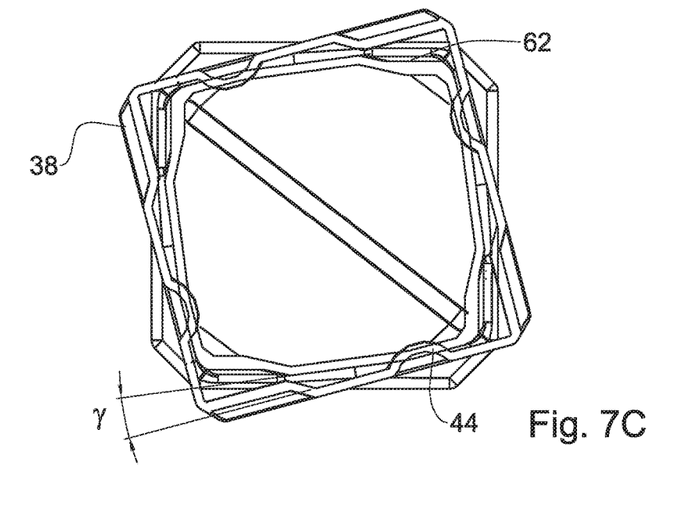
FIG. 7C is a top planar view of FIG. 7B.

The arrangement is such that the side walls of one or both of the cover member 22 and the receptacle member 24 are essentially rigid though elastically deformable to an extent facilitating their deformation while twisted at opposite directions along the longitudinal axis X (in direction of indicia arrows 70 and 71, and as illustrated by arrows 73 and 75 in FIG. 6), against the biasing effect of bulges 44, whereby upon such elastic deformation the arresting teeth 38 of the cover member 22 disengaged from the locking teeth 62 of the receptacle member 24, into the unlocked position, thus facilitating axial displacement of the receptacle member 24 with respect to the cover member 22 (i.e., telescopically). However, once stopping the twisting force applied to both the cover member 22 and the receptacle member 24, the members reassume their initial shape and the arresting teeth 38 of the cover member 22 reengage with the locking teeth 62 of the receptacle member 24.

The size of the bulges 44 and the extent at which they project from the inside surface 31 of the cover member 22 define, among other factors (e.g., the inclination ratio of the surface portion 56a; clearance between the circumcircle of the polygonal portion of the receptacle member and the inscribed circle of the polygonal locking neck of the cover member), the extend of elastic deformation of one or both the cover member 22 and the receptacle member 24.

The arresting teeth 38 of the cover member 22, and the plurality of locking teeth 62 of the receptacle member 24 are equally spaced along an axial path and are further of uniform thickness (axially measured), so as to substantially reduce or eliminate axial freedom between the cover member and the receptacle member, at the locked position.

Although not illustrated, it is appreciated that one or both of the cover member and the receptacle member may comprise a tool receiving/supporting portion for securely supporting a tool (e.g., drill bit) at a motion free configuration.

Figure 8A:
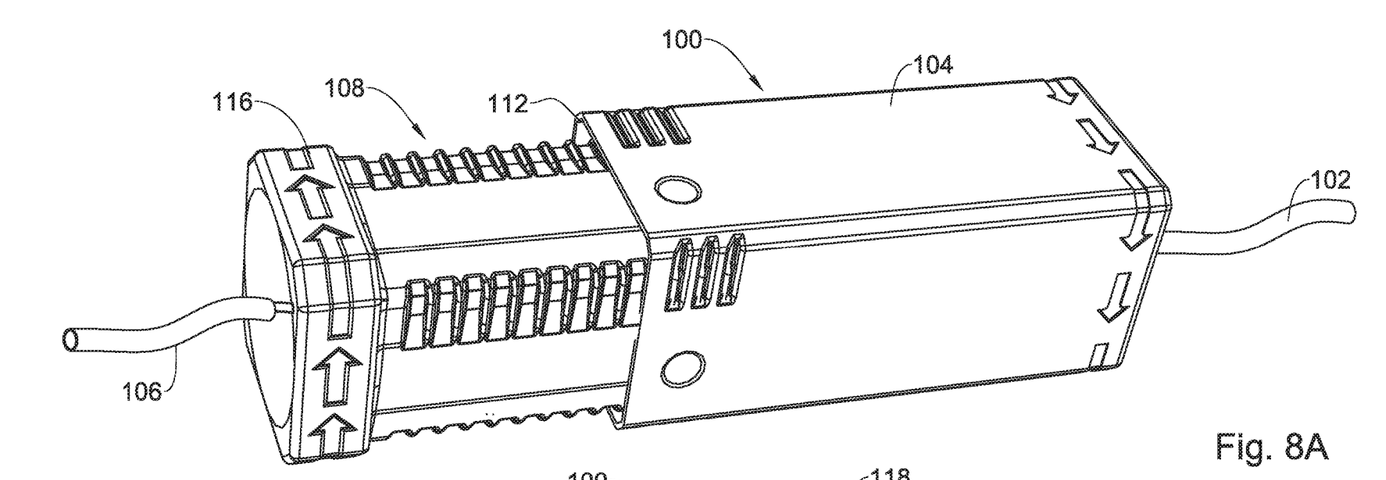
FIGS. 8A and 8B are perspective views of a coupler according to an example of the present disclosure, at a slack, unlocked position, and at a tensioned, locked position, respectively.
Figure 8B:
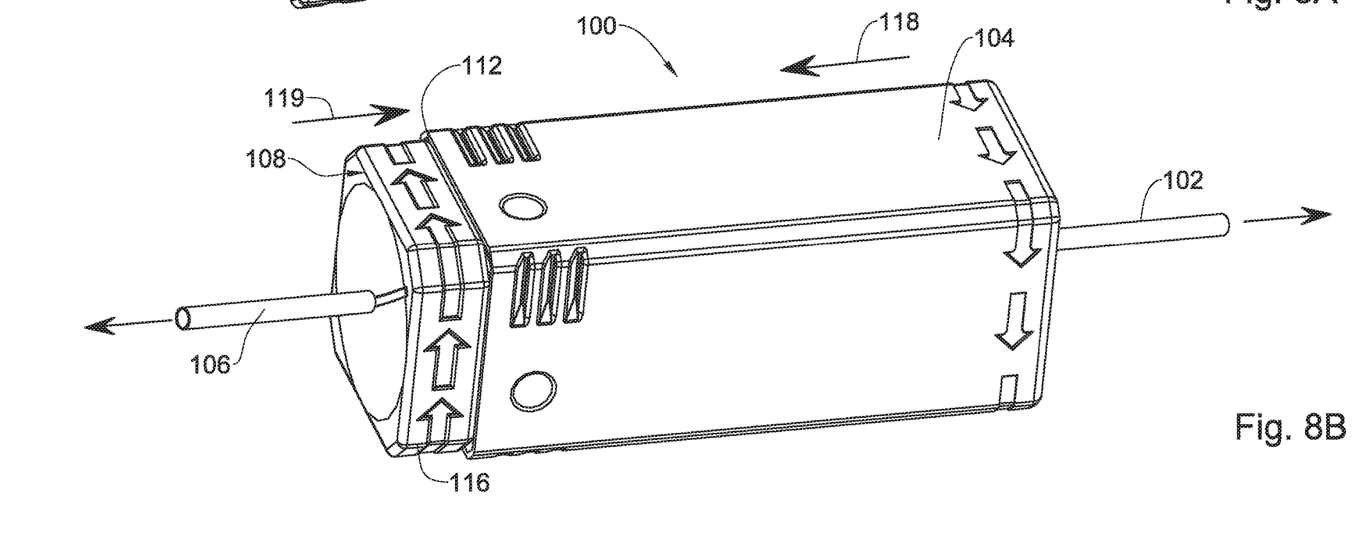

Turning now to FIGS. 8A and 8B of the drawings there is illustrated a different example of an article according to the present disclosure, however following the same principals. In the drawings there is provided a coupler 100 configured for coupling a first cord 102 articulated to a cover member 104, to a second cord 106 which in turn is articulated to a receptacle member 108. The cover member 104 and the receptacle member 108 are substantially similar in structure and in operation to the arrangement disclosed herein above with reference to FIGS. 1 to 7, whereby in FIG. 8A the coupler 100 is at the unlocked position and the neck end 112 of the cover member 104 is remote from the manipulating portion 116 of the receptacle member 108, so that the cords 102 and 106 are slack/lose. However, advancing the neck end 112 of the cover member 104 towards the manipulating portion 116 of the receptacle member 108 (in direction of arrows 119B; FIG. 9B) results in tensioning the cords 102 and 104, whereby the two members are retained at this position. Loosening the cords will thus require twisting the cover member and the receptacle member so as to perform the deformation required for unlocking the engaged locking teeth, as discussed hereinabove.

The invention claimed is:

1. A system for axial coupling a first member with a second member, said first member comprising at least a polygonal locking neck telescopingly receiving a polygonal portion of the second member; at least one inside wall of said polygonal locking neck comprising at least one arresting member;
   at least one outside face of the polygonal portion of the second member comprising an arresting portion having a plurality of locking teeth disposed along said arresting portion;

wherein a circumcircle of the polygonal portion of the second member is smaller than an inscribed circle of the polygonal locking neck of the first member, thereby facilitating reciprocation of the polygonal portion of the second member about a longitudinal axis between a locked position at which the at least one arresting member is engaged with at least one of the plurality of locking teeth of the second member, thereby preventing axial displacement of the first member with respect to the second member, and an unlocked position at which the at least one arresting member is disengaged from the at least one of the plurality of locking teeth of the second member, thereby facilitating axial displacement of the first member with respect to the second member;

and wherein one or both of the first member and the second member comprises a biasing arrangement configured for biasing the second member in a locking direction into the locked position and wherein one or both of the polygonal locking neck of the first member and the polygonal portion of the second member are elastically deformable, whereby twisting the first member and the second member in opposite directions, whereby the second member is twisted in a direction opposite the locking direction, results in disengaging the at least one of the plurality of locking teeth of the second member from the at least one arresting member of the first member.

2. The system according to claim 1, the second member being normally biased into the locked position, wherein unlocking requires applying a twisting motion to the first member and the second member by elastic deformation of one or both, thereby facilitating axial displacement when first and second members are twisted against said biasing arrangement, wherein upon stopping the external twisting force applied to the first and second members, the locking position is spontaneously reassumed.

3. An article comprising a first member and a second member at least partially slidingly received within said first member and axially displaceable therewithin; said first member comprising at least a polygonal locking neck telescopingly receiving a polygonal portion of the second member; at least one inside wall of said polygonal locking neck comprising at least one arresting member; at least one outside face of the polygonal portion of the second member comprising an arresting portion having a plurality of locking teeth disposed along said arresting portion;

wherein a circumcircle of the polygonal portion of the second member is smaller than an inscribed circle of the polygonal locking neck of the first member, thereby facilitating reciprocation of the polygonal portion of the second member about a longitudinal axis between a locked position at which the at least one arresting member is engaged with at least one of the plurality of locking teeth of the second member, thereby preventing axial displacement of the first member with respect to the second member, and an unlocked position at which the at least one arresting member is disengaged from the at least one of the plurality of locking teeth of the second member, thereby facilitating axial displacement of the first member with respect to the second member; and    wherein one or both of the first member and the second member comprises a biasing arrangement for biasing the second member into the locked position and wherein one or both of at least the polygonal locking neck of the first member and the polygonal portion of the second member are elastically deformable, whereby twisting the first member and the second member at an opposite sense, against said biasing arrangement, results in disengaging the at least one of the plurality of locking teeth of the second member from the at least one arresting member of the first member.

4. A container comprising a first member and a second member at least partially slidingly received within said first member and axially displaceable therewithin and configured for selective axial arresting within said first member, said first member comprising at least a polygonal locking neck telescopingly receiving a polygonal portion of the second member; at least one inside wall of said polygonal locking neck comprising at least one arresting member; at least one outside face of the polygonal portion of the second member comprises an arresting portion having a plurality of locking teeth disposed along said arresting portion;
wherein a circumcircle of the polygonal portion of the second member is smaller than an inscribed circle of the polygonal locking neck of the first member, thereby facilitating reciprocation of the polygonal portion of the second member about a longitudinal axis between a locked position at which the at least one arresting member is engaged with the at least one of the plurality of locking teeth of the second member, thereby preventing axial displacement of the first member with respect to the second member, and an unlocked position at which the at least one arresting member is disengaged from the at least one of the plurality of locking teeth of the second member, thereby facilitating axial displacement of the first member with respect to the second member; and wherein one or both of the first member and the second member comprises a biasing arrangement for biasing the second member into the locked position and wherein one or both of at least the polygonal locking neck of the first member and the polygonal portion of the second member is elastically deformable, whereby twisting the first member and the second member at an opposite sense, against said biasing arrangement, results in disengaging the at least one of the plurality of locking teeth of the second member from the at least one arresting member of the first member.

5. The container according to claim 4, the second member being normally biased into the locked position, wherein unlocking requires applying a twisting motion to the first member and the second member by elastic deformation of one or both, thereby facilitating axial displacement when first and second members are twisted against said biasing arrangement, wherein upon stopping the external twisting force applied to the first and second members, the locking position is spontaneously reassumed.

6. The container according to claim 4, wherein the first member has a rectangular cross section and the second member has a square cross section however wherein the arresting portion of each side wall thereof is disposed at an obtuse angle with respect to the respective side wall, and wherein the arresting portion of each to neighboring side walls are disposed at a right angle with respect to one another.

7. The container according to claim 4, wherein the profile of one or both of the at least one arresting member of the first member and the plurality of locking teeth of the second member facilitates axial displacement of the first member and the second member towards one another, also at the locked position thereof.

8. The container according to claim 4, wherein the biasing arrangement is a biasing projection extending at either an outside wall surface of the second member or an inside wall surface of the first member, said biasing projection being configured for slidingly bearing against a respective other wall surface of the an outside wall surface of the second member or an inside wall surface of the first member.

9. The container according to claim 8, wherein the biasing arrangement is a bulge projecting from inside face of side walls at the polygonal locking neck of the first member.

10. The container according to claim 4, wherein the at least one arresting member and the at least one of the plurality of locking teeth intersect a longitudinal axis of the first member and the second member at a right angle.

11. The container according to claim 4, wherein angular displacement of the second member within the first member, at the locked position, is restricted upon engagement of the corners of the second member with a respective inside wall surface of the first member.

12. The container according to claim 4, wherein the at least one arresting member of the first member, and the plurality of locking teeth of the second member, are equally spaced along an axial path and are of of uniform thickness, so as to reduce or eliminate axial freedom between the first member and the second member, at the locked position.

13. The container according to claim 4, wherein one or both of the first member and the second member of a container comprises a tool supporting portion.

* * * * *